United States Patent [19]

Ishimaru

[11] Patent Number: 5,162,836
[45] Date of Patent: Nov. 10, 1992

[54] TEMPERATURE MEASURING APPARATUS FOR CAMERA

[75] Inventor: Toshiaki Ishimaru, Hino, Japan

[73] Assignee: Olympus Optical Co., Ltd., Tokyo, Japan

[21] Appl. No.: 735,297

[22] Filed: Jul. 24, 1991

[30] Foreign Application Priority Data

Mar. 20, 1990 [JP] Japan .................................. 2-71025

[51] Int. Cl.⁵ ......................... G03B 1/00; G03B 7/22; G03B 13/36
[52] U.S. Cl. ................................ 354/410; 354/173.1; 354/214; 354/400
[58] Field of Search ............ 354/400, 410, 464, 173.1, 354/173.11, 214

[56] References Cited

U.S. PATENT DOCUMENTS 4,982,216 1/1991 Kudo et al. ........................ 354/400

FOREIGN PATENT DOCUMENTS 57-64204 4/1982 Japan .
2-173711 7/1990 Japan .

Primary Examiner—W. B. Perkey
Attorney, Agent, or Firm—Frishauf, Holtz, Goodman & Woodward

[57] ABSTRACT

A temperature measuring apparatus for a camera includes an actuator for performing an operation of the camera. A time measuring unit starts time measurement when the actuator finishes its operation and is set in an inoperative state, and outputs timeover information when a time period required for the temperature of a camera which is increased by the operation of the actuator to return to an initial temperature upon finishing of the operation of the actuator elapses. A storage unit stores the timeover information. A temperature measuring unit is provided in an IC and measures the temperature of the camera. A power switch supplies power from a power source to the camera. A temperature measurement permitting/inhibiting unit permits the temperature measurement of the temperature measuring unit when the timeover information is stored in the storage unit upon an operation of the power switch, and inhibits the temperature measurement of the temperature measuring unit when the timeover information is not stored in the storage unit upon an operation of the power switch. A temperature storage unit stores the temperature measurement result when the temperature measurement permitting/inhibiting unit permits the temperature measurement. A control unit controls the actuator in consideration of the temperature measurement result.

31 Claims, 4 Drawing Sheets

TEMPERATURE MEASURING APPARATUS FOR CAMERA

BACKGROUND OF THE INVENTION

1. Field of the Invention

The present invention relates to a camera and, more particularly, to a temperature measuring apparatus for a camera, which compensates a shutter driving voltage or a lens extending amount in accordance with the temperature.

2. Description of the Related Art

Recently, plastic lenses or plastic barrels have been widely used in cameras. In a camera which performs focus adjustment by extending a lens, however, a focal point may be shifted due to a change in shape of a plastic lens caused by a temperature change because a plastic material has a large thermal expansion coefficient. As a method of preventing such a shift in focal point, Published Unexamined Japanese Patent Application No. 57-64204 proposes a technique of detecting the ambient temperature and compensating a change in focal length of a photographic lens caused by a temperature change in accordance with the detected temperature, thereby obtaining a proper focal point.

In addition, when a gear train formed by molding is used in a camera which controls shutter driving by an open loop, a change in friction coefficient of the gear train caused by temperature change has a direct effect on an aperture waveform. As a means for preventing this inconvenience, there is a conventionally known technique of maintaining an aperture waveform constant by compensating a shutter driving voltage or a driving duty ratio in accordance with the temperature. To properly perform compensation in accordance with a temperature change, the temperature of a plastic lens or a plastic barrel must be accurately measured. A thermistor can be used as a means for measuring the temperature. To reduce the manufacturing cost of a camera, however, a temperature measuring circuit is often incorporated in a controlling integrated circuit (IC) for controlling a shutter motor or a lens motor of a camera to perform compensation assuming that a temperature measured by the temperature measuring circuit is the temperature of a lens or a barrel.

When an actuator is driven, however, the temperature of the IC is increased by generated heat. Therefore, even when the temperature is measured by using the temperature measuring circuit incorporated in the IC, since a difference between the measured temperature in the IC and the temperature of a lens or a barrel is large, no accurate compensation can be performed.

To solve the above problem, Published Unexamined Japanese Patent Application No. 2-173711 proposes a method of measuring a temperature after a release button is depressed and before an actuator is driven for a photographing operation and performing the above compensation on the basis of the measurement value. In this method, a timer is activated after the operation of the actuator is finished, and temperature measurement is permitted only when the release button is depressed after a predetermined time period elapses from the end of operation of the actuator.

In the method proposed in Published Unexamined Japanese Patent Application No. 2-173711, however, if compensation according to the temperature must be performed before driving of the actuator, e.g., if an extending amount of a photographic lens, or a photometric value or a distance measurement value must be compensated in accordance with the temperature, or if a driving voltage for an optical system or a shutter must be compensated in accordance with the temperature, temperature measurement is performed after the release button is depressed, and then the actuator is driven. Therefore, a new problem arises in which a time lag from depression of the release button to start of photographing is increased by a time period required for temperature measurement.

In addition, in a camera which determines operation conditions such as exposure of the camera on the basis of obtained temperature data and displays the determination results, the temperature data indicates the temperature measured immediately before an immediately preceding operation of an actuator, whereas temperature data used in actual compensation indicates the temperature measured after a release button is depressed. Therefore, a displayed exposure value is sometimes different from an actual exposure value.

SUMMARY OF THE INVENTION

It is, therefore, an object of the present invention to provide a temperature measuring apparatus for a camera in which no time lag as described above is produced and display data coincides with actual operation data.

In order to achieve the above object of the present invention, there is provided a temperature measuring apparatus for a camera, comprising:

an actuator for performing an operation of the camera;

time measuring means for starting time measurement after the actuator finishes an operation and is set in an inoperative state, and outputting timeover information when a time period required for a temperature of the camera increased by the operation of the actuator to return to an initial temperature upon finishing of the operation of the actuator elapses;

storage means for storing the timeover information output from the time measuring means;

temperature measuring means, provided in an IC (integrated circuit), for measuring a temperature of the camera;

a power switch for supplying power to the camera;

temperature measurement permitting/inhibiting means for permitting temperature measurement by the temperature measuring means when the timeover information is stored in the storage means upon an operation of the power switch, and inhibiting the temperature measurement by the temperature measuring means when the timeover information is not stored in the storage means upon an operation of the power switch;

temperature storage means for storing a temperature measurement result obtained by the temperature measuring means when the temperature measurement is permitted by the temperature measurement permitting-/inhibiting means; and control means for controlling the actuator in consideration of the temperature measurement result stored by the temperature storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
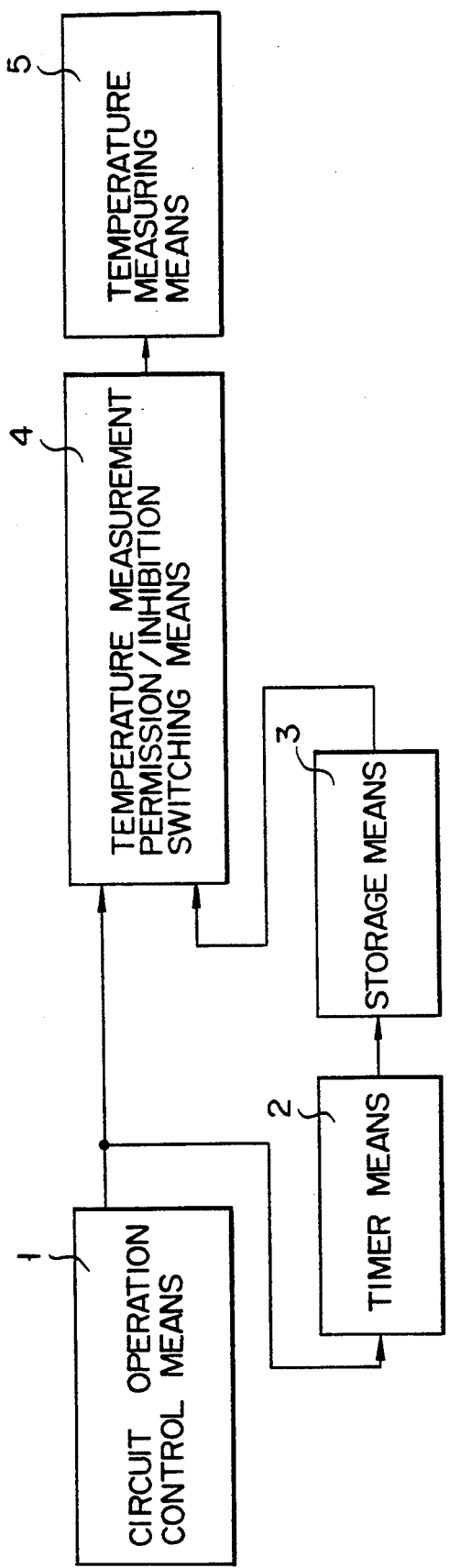
FIG. 1 is a block diagram schematically showing a temperature measuring apparatus for a camera according to the present invention.

FIG. 1 is a block schematically showing a temperature measuring apparatus for a camera according to the present invention. Referring to FIG. 1, reference numeral 1 denotes a circuit operation control means for instructing whether an actuator or an electric circuit for display is to be set in an operative or inoperative state; 2, a timer means for measuring a time period from the timing at which the circuit operation control means 1 outputs the OFF instruction; 3, a storage means for storing information indicating whether the timer means 2 finishes time measurement; 4, a temperature measurement permission/inhibit switching means for determining, upon receiving the outputs from the circuit operation control means 1 and the storage means 3, whether measurement of the temperature is to be permitted; and 5, a temperature measuring means for measuring the temperature.

An operation of the temperature measuring apparatus having the above arrangement will be described below. The circuit operation control means 1 generates an instruction signal for setting an actuator in a camera in an operative state when the camera is operated and generates an instruction signal for setting the actuator in an inoperative state (low consumption power state) when the camera is not operated for a predetermined time period or more. Upon receiving this instruction signal, the timer means 2 outputs an instruction for setting the actuator in the inoperative state and starts time measurement. When a predetermined time period elapses from the start of time measurement, the timer means outputs a time measurement end signal. Upon receiving the time measurement end signal from the timer means 2, the storage means 3 stores information indicating whether the timer means 2 finishes the time measurement. The temperature measurement permission/inhibit switching means 4 reads out the information stored in the storage means at the same time it receives the ON instruction signal from the circuit operation control means 1. If the time measurement of the timer means 2 is finished, the time measurement permission/inhibit switching means 4 permits measurement of the temperature. Otherwise, the means 4 inhibits the temperature measurement. Upon receiving an output from the temperature measurement permission/inhibit switching means 4, the temperature measuring means 5 performs temperature measurement when the temperature measurement is permitted and does not perform it when inhibited.

Figure 2:
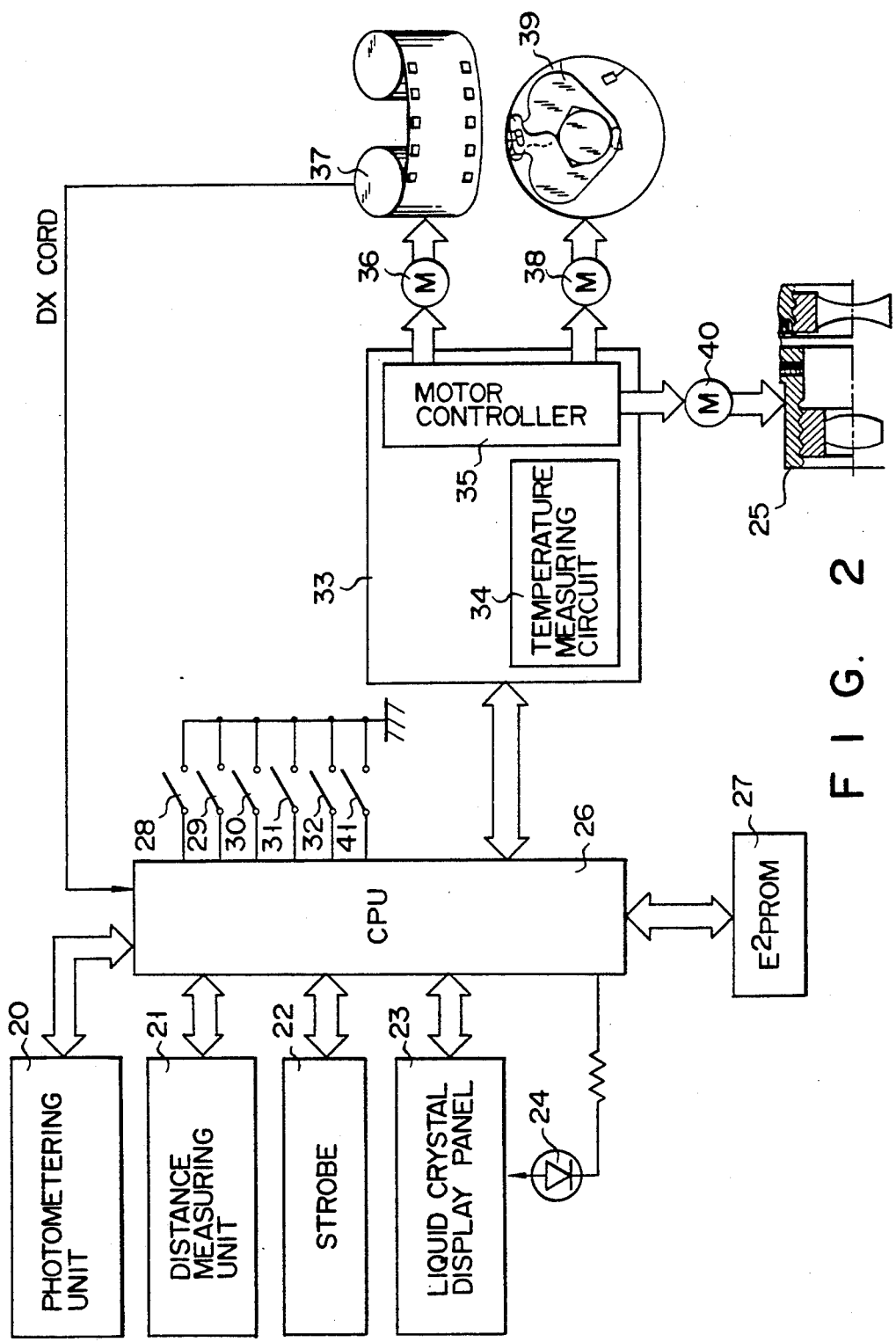
FIG. 2 is a block diagram showing an arrangement of a camera to which the present invention is applied.

FIG. 2 shows an arrangement of a camera to which the present invention is applied.

A CPU 26 is connected to a power SW 28, a first release SW 29, a second release SW 30, a rear cover SW 31, a mode SW 32 for setting various modes such as a distance measurement mode and a strobe mode, and rewind SW 41 for rewinding a film. In addition, the CPU 26 receives exposure information from a photometering unit 20, a DX cord, and a strobe 22, and object distance information from a distance measuring unit 21.

State display of the camera is performed by a liquid crystal display panel 23 or an LED 24.

In response to information from the above respective parts, the CPU 26 performs communications with an interface IC 33 to control a motor controller 35 or a temperature measuring circuit 34.

That is, in response to a control instruction from the CPU 26, the motor controller 35 drives a wind-up motor 36 to wind or rewind a film 37. In addition, the motor controller 35 drives a shutter motor 38 to control an operation of a shutter 39 and drives a lens motor 40 to move a photographic lens 25 by a predetermined amount.

When the above respective motors are driven, the interface IC 33 generates heat. In the present invention, therefore, the CPU 26 writes a temperature measurement permission flag=0 in an E²PROM 27 when the motors are driven, and waits for a predetermined time period until the interface IC 33 is returned to room temperature after liquid crystal display is turned off, as will be described later. After the predetermined time period elapses, the CPU 26 writes a distance measurement permission flag=1 in the E²PROM 27 to set the low consumption power state.

When one of the SWs 28 to 41 is turned on, the CPU 26 is returned from the low consumption state and checks the temperature measurement permission flag of the E²PROM 27. If the flag is "0", the CPU 26 does not allow the temperature measuring circuit 34 to perform temperature measurement. If the flag is "1", the CPU 26 causes the temperature measuring circuit 34 to perform temperature measurement, and stores the obtained temperature data in the E²PROM 27. The temperature data stored in the E²PEOM 27 is used to compensate the driving amount of the photographic lens 25 or the driving voltage of the shutter 39 in accordance with a temperature change. As the temperature measuring circuit 34, use may be made of one disclosed in FIG. 3 of U.S. patent application Ser. No. 710,054. It is also possible to use a known temperature circuit, such as a temperature measuring circuit as shown in FIG. 6 of U.S. Pat. No. 4,982,216.

That is, the temperature measuring apparatus for a camera according to the present invention compensates the actuator driving amounts such as the extending amount of a lens, the shutter driving voltage, and the driving frequency, output from the motor controller 35, by using the temperature data stored in the E²PROM 27, taking into consideration that the characteristics of the wind-up motor 36, the shutter motor 38, the lens motor 40, and the like as an actuator change in accordance with a temperature change, or that the photographic lens 25 or the shutter 39 driven by the actuator causes a positional deviation or torque change due to a temperature change. The CPU 26 performs an arithmetic operation of the actuator driving amounts taking the compensation amount into consideration.

The ambient temperature of the temperature measuring circuit 34 is increased by heat generated upon operation of the actuator or the motor controller 35 or upon operation of the electric circuit for displaying, e.g., an exposure permission state. In the present invention, therefore, when the actuator is in the operative state or the motor controller 35 operates, the CPU 26 inhibits the temperature measurement until the ambient temperature of the temperature measuring circuit 34 is returned to the same temperature as the temperature of the parts for performing compensation.

The temperature measurement permission flag of the $E^2PROM$ 27 is "1" when the ambient temperature of the temperature measuring circuit 34 is the same as the temperature of the parts for performing compensation. The temperature measurement permission flag is "0" when the ambient temperature of the temperature measuring circuit 34 is not the same as the temperature of the parts for performing compensation, i.e., when the actuator is in the operative state or the motor controller 35 operates, or when a predetermined time period has not elapsed after the actuator was switched to the inoperative state or finished its operation.

If the temperature measurement permission flag of the $E^2PROM$ 27 is "1" when the actuator is switched from the inoperative to operative state, the ambient temperature of the temperature measuring circuit 34 is the same as the temperature of the parts for performing compensation. Therefore, the CPU 26 inhibits an operation of the timer to disable time measurement. If the temperature measurement permission flag of the $E^2PROM$ 27 is "0", the CPU permits the timer operation.

After a predetermined time period elapses, i.e., the ambient temperature of the temperature measuring circuit 34 becomes the same as the temperature of the parts for performing compensation, the CPU 26 sets "1" in the temperature measurement permission flag of the $E^2PROM$ 27 to permit temperature measurement.

Switching between the operative and inoperative states is performed by turning on/off the power SW 28 of the camera. However, in a camera which is automatically set in an inoperative state when a predetermined time period elapses with no operation performed, switching is also performed when the camera is returned from the inoperative to operative state.

Figure 3A:
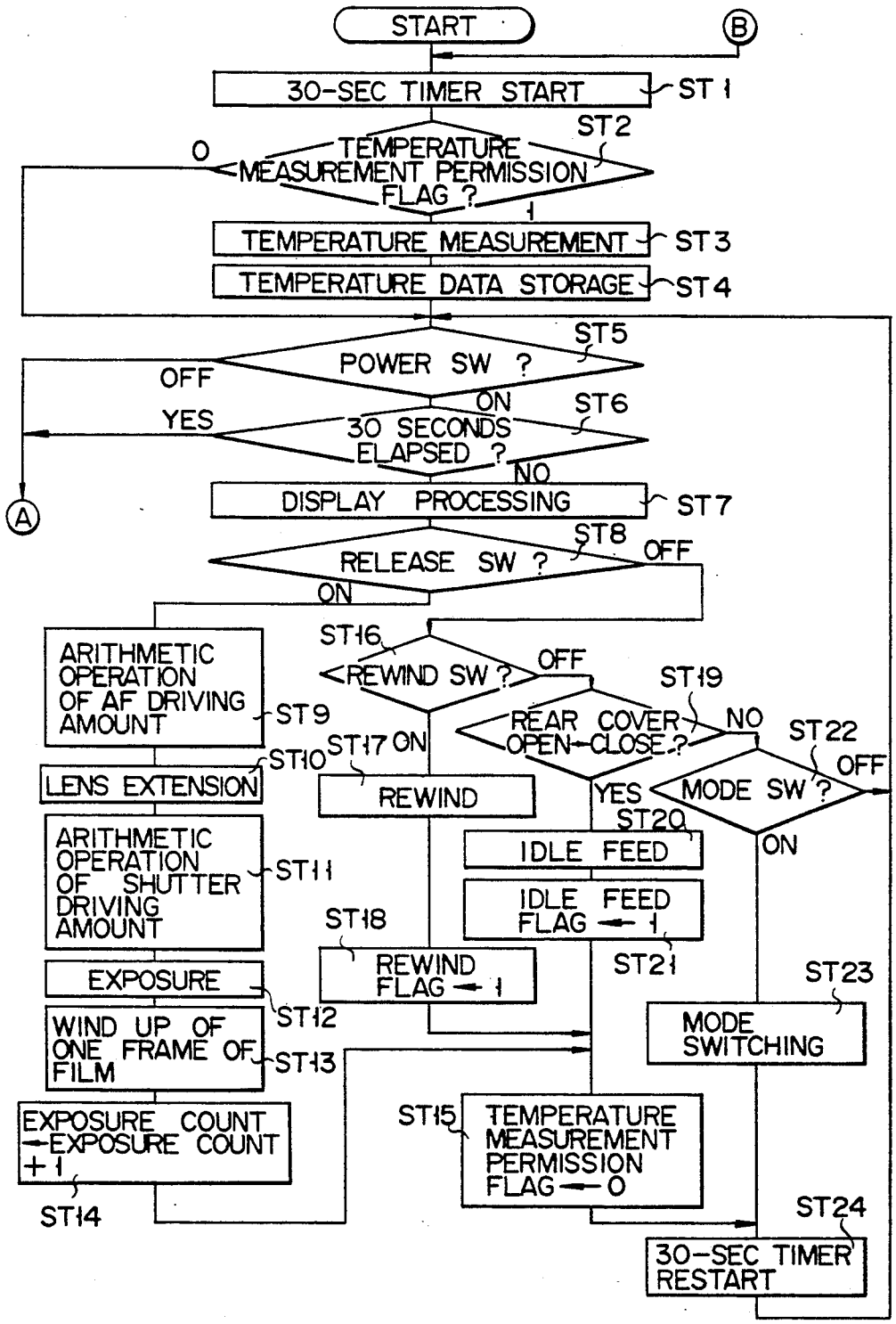
FIGS. 3A and 3B are flow charts for explaining the procedures of a temperature measurement control operation according to the present invention.
Figure 3B:
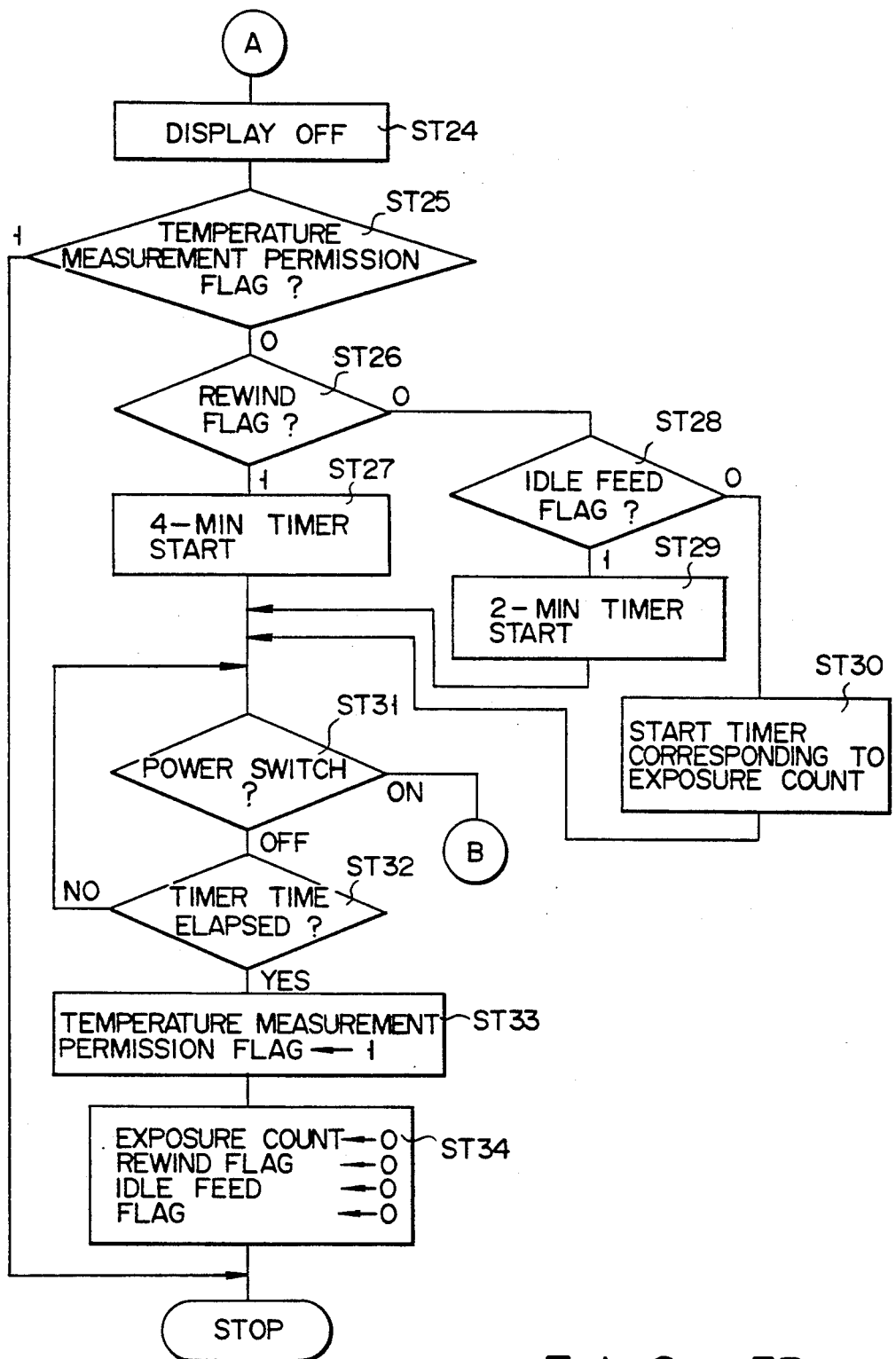

A temperature measurement control operation of the temperature measuring apparatus for a camera according to this embodiment will be described below wit reference to FIGS. 3A and 3B. Note that an operation sequence to be described below is executed by the CPU 26 for controlling the entire camera.

When the power SW 28 of the camera is turned on, a 30-sec timer is started to measure 30 seconds for performing display (step ST1). Subsequently, the temperature measurement permission flag of the $E^2PROM$ 27 is checked (step ST2). If the temperature measurement permission flag is "1", the temperature measuring circuit 34 measures a temperature (step ST3), and the measured temperature is stored in the $E^2PROM$ 27 (step ST4). If the temperature measurement permission flag of the $E^2 PROM$ 27 is "0", step ST5 and the subsequent steps are directly executed.

In step ST5, whether the power SW 28 is ON is checked. If the power SW 28 is ON, whether 30 seconds have elapsed from the start of the 30-sec timer is checked in step ST6. Note that the power SW 28 may be a switch for performing switching from the operative to in operative state. If 30 seconds have not elapsed, display processing (step ST7) is performed, and the first and second release SWs 29 and 30 are checked (step ST8). If the SWs are ON, the calculation of an amount of AF drive is carried out on the basis of object distance measurement information from the distant measuring unit 21 and a calculation value thus obtained is corrected using temperature measuring information stored in $E^2PROM$ 27 (ST9). The way of correction may be by either adding a correction value corresponding to a temperature to the amount of AF drive as shown in U.S. Pat. No. 4,982,216 or multiplying temperature measuring information by a predetermined value and then adding a result to the amount of AF drive. In this way, the photographic lens 25 is moved by a predetermined amount by the lens motor in accordance with the calculation value corresponding to the amount of the AF drive (step ST10). Subsequently, in steps ST11 and ST12, the shutter 39 is driven to perform exposure by the shutter motor 38 in accordance with the arithmetic operation value obtained by arithmetically operating the shutter driving amount on the basis of the exposure information from the photometering unit 20. In the calculation of the amount of drive of the shutter 39, correction is made against the calculation value by the use of the temperature measuring information stored in $E^2PROM$ 27 as in the calculation of the amount of AF drive set out above. The way of correction is by either correcting the shutter drive voltage in accordance with the temperature as set out above or changing the duty ratio of the drive voltage.

After the film 37 is wound up by one frame in step ST13, the exposure count is incremented by one, and the obtained value is stored in the RAM of the CPU 26 (step ST14).

Since the ambient temperature of the temperature measuring circuit 34 is increased by driving the actuator, the temperature measurement permission flag of the $E^2PROM$ 27 is set to "0" (step ST15), and the 30-sec timer is reset and started again (step ST23).

If the first and second release SWs 29 and 30 are OFF, the rewind SW 41 is checked (step ST16). If the rewind SW 41 is ON, rewinding of the film 37 is executed (step ST17), and a rewind flag is set to "1" (step ST18). In addition, the temperature measurement permission flag of the $E^2PROM$ 27 is set to "0" (step ST15), and the 30-sec timer is restarted (step ST24). If the rewind SW 41 is OFF, opening/closing of the rear cover SW 31 is checked (step ST19). If the rear cover SW 31 is switched from the open to closed state, idle feed is performed (step ST20), and an idle feed flag is set to "1" (step ST21). In addition, the temperature measurement permission flag of the $E^2PROM$ 27 is set to "0" (step ST15), and the 30-sec timer is restarted (step ST24).

If the rear cover SW 31 is not switched from the open to closed state, the mode SW 32 is checked (step ST22). If the mode SW 32 is ON, a mode is switched in step ST23. Since, however, a rise in ambient temperature of the temperature measuring circuit 34 is negligible, the temperature measurement permission flag of the $E^2PROM$ is not changed.

When the mode SW 32 is OFF and the 30-sec timer is restarted, the power SW 28 is checked again (step ST5). If the power SW 28 is ON, steps ST6 to ST24 are repeatedly executed. If the power SW 28 is OFF and 30 seconds elapse in step ST6, step ST24 and the subsequent steps are executed.

After the display is turned off in step ST25, the temperature measurement permission flag of the E²PROM 27 is checked (step ST26). If the flag is "1", since the ambient temperature of the temperature measuring circuit 34 is not increased, the CPU 26 is immediately stopped. If the temperature measurement permission flag is "0", steps ST27 to ST31 are executed. First, the rewind flag is checked (step ST27). If the flag is "1", a four-min timer is started (step ST28). If the rewind flag is "0", the idle feed flag is checked (step ST29). If the idle feed flag is "1", a two-min timer is started (step ST30). If the idle feed flag is "0", the exposure count is read out, and a timer having a time corresponding to the readout count is started. Thereafter, checking of the power SW 28 (step ST32) and checking of the timer means 2 (step ST33) are alternately performed. If the power SW 28 is turned on, the sequence is executed again from step ST1. If the timer finishes time measurement, the temperature measurement permission flag of the E²PROM 27, the exposure count, the rewind flag, and the idle feed flag are set to "0" (steps ST34 and ST35), and the CPU 26 is stopped.

Thus the temperature measuring permission flag is not set to "1" unless four minutes lapse after the completion of the motor 36 for the case where the motor is driven upon the wind-back of the film, unless two minutes lapse after the completion of the motor 36 for the case where the motor 36 is driven upon the making of the idle feed following the loading of a film or unless a time corresponding to an exposure interval lapses for the case where the motor 36 is driven for regular film exposure to be done. In the case where, before the lapse of the aforementioned time, step ST goes past the flow process B or goes back to a short again, temperature measuring is not performed as a result of determining the temperature measuring permission flag at step ST2.

This is done to prevent erroneous temperature measurement, because, due to the generation of heat by the motor, the ambient temperature around the temperature measuring circuit is not returned back to the ordinary temperature over a predetermined period of time after the driving of the motor has been completed. In this case, the temperature correction at step STs 9 and 11 is carried out such that temperature measuring is performed before the driving of the motor 36 and then correction is made with the use of a value stored in E²PROM 27.

Note that "the CPU is stopped" means that oscillation of clock pulses for operating the microcomputer is stopped to set the microcomputer in a low consumption power mode. Return to the operative state from this state can be realized by turning on the power SW 28 or operating another switch. An operation for returning to the operative state depends on the specification of a product. When the power SW 28 is turned on, the CPU 26 executes the sequence from step ST1 again.

In the above embodiment, the temperature measurement control operation is started by turning on the power SW 28. However, the temperature measurement control operation may be started by turning on all or a specific one of the other switches.

In the embodiment, if the power SW 28 is ON in step ST31, i.e., if the power SW 31 is turned on before the ambient temperature of the temperature measuring circuit 34 is returned to a normal state, the temperature measuring circuit 34 does not perform temperature measurement. That is, the temperature measurement circuit 34 performs temperature measurement only when the power SW 28 is turned on after it is determined in step ST32 that the time measurement is finished. Therefore, even when the ambient temperature of the temperature measuring circuit 34 is increased by an operation of the actuator or the like, temperature measurement can be accurately performed by a simple method.

As has been described above, according to the present invention, the temperature measurement timing is controlled in association with an operation or stop of an operation of the actuator or the like of a camera. Therefore, there is provided a temperature measuring apparatus for a camera, in which no time lag is produced and a display does not differ from an actual operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A temperature measuring apparatus for a camera, comprising:
    an actuator for performing an operation of said camera;
    time measuring means for starting time measurement after said actuator finishes an operation and is set in an inoperative state, and outputting timeover information when a time period required for a temperature of said camera increased by the operation of said actuator to return to an initial temperature upon finishing of the operation of said actuator elapses;
    storage means for storing the timeover information output from said time measuring means;
    temperature measuring means, provided in an IC (integrated circuit), for measuring a temperature of said camera;
    a power switch for supplying power to said camera;
    temperature measurement permitting/inhibiting means for permitting temperature measurement by said temperature measuring means when the timeover information is stored in said storage means upon an operation of said power switch, and inhibiting the temperature measurement by said temperature measuring means when the timeover information is not stored in said storage means upon an operation of said power switch;
    temperature storage means for storing a temperature measurement result obtained by said temperature measuring means when the temperature measurement is permitted by said temperature measurement permitting/inhibiting means; and
    control means for controlling said actuator in consideration of the temperature measurement result stored by said temperature storage means.

2. An apparatus according to claim 1, wherein said time measuring means includes means for outputting the timeover information at a timing corresponding to the type of an operating actuator.

3. An apparatus according to claim 1, wherein said control means includes means for controlling said actuator using the temperature measurement result stored in said temperature storage means upon an immediately preceding operation of said power switch when said temperature measurement inhibiting means inhibits the temperature measurement.

4. An apparatus according to claim 1, wherein said actuator includes means for performing exposure of said camera.

5. An apparatus according to claim 1, wherein said actuator includes means for performing rewinding of a film.

6. An apparatus according to claim 1, wherein said actuator includes means for performing winding of a film.

7. A temperature measuring apparatus for a camera, comprising:
- an actuator for performing an operation of said camera;
- an IC (integrated circuit) including a microcomputer for outputting control signals for controlling said actuator and temperature measuring means for measuring a temperature of said camera; and
- an operation switch of said camera,
- wherein said microcomputer comprises:
- time measuring means for starting time measurement when said actuator finishes operation,
- temperature measurement permission storage means for storing temperature measurement permission information when said actuator does not operate for a predetermined time period measured by said time measuring means,
- temperature measurement control means for causing said temperature measuring means to execute temperature measurement and output a temperature measurement result when the temperature measurement permission information is stored upon an operation of said operation switch,
- temperature storage means for storing the temperature measurement result, and
- control means for performing temperature compensation for a drive signal of said actuator using the temperature measurement result stored in said temperature storage means.

8. An apparatus according to claim 7, further comprising means for stopping said microcomputer when said actuator does not operate during the time measurement of a predetermined time period performed by said time measuring means, and starting the operation of said temperature measurement control means when said operation switch is operated.

9. An apparatus according to claim 7, wherein said temperature measurement control means includes means for outputting a temperature measurement result stored in said temperature storage means upon an immediately preceding operation of said power switch to said control means when the temperature measurement permission information is not stored in said temperature measurement permission storage means.

10. An apparatus according to claim 7, wherein said operation switch comprises a power switch for commanding said camera to switch on a power source.

11. An apparatus according to claim 7, wherein said temperature measurement permission information storage means comprises a nonvolatile memory which holds stored contents when a power source of said camera is switched off.

12. An apparatus according to claim 7, wherein said temperature storage means comprises a nonvolatile memory which holds stored contents when a power source of said camera is switched off.

13. A temperature measuring apparatus for a camera, comprising:
- an IC (integrated circuit) incorporating temperature measuring means for measuring a temperature of said camera;
- an actuator for performing an operation of said camera;
- time measuring means for starting time measurement when said actuator finishes an operation and generating an output when a predetermined time period elapses;
- storage means for storing information indicating that the predetermined time has elapsed when said time measuring means generates the output;
- means for immediately causing said temperature measuring means to perform temperature measurement when the information is stored upon an operation of an operation switch of said camera; and
- temperature storage means for storing a temperature measurement result detected by the temperature measurement.

14. An apparatus according to claim 13, wherein said operation switch comprises a power switch for commanding said camera to switch on a power source.

15. A camera for measuring and storing a temperature in a camera body and executing a predetermined camera operation using the stored temperature information, comprising:
- first switching means for switching an operation mode of said camera to a low consumption power mode after one of various camera operations including the predetermined camera operation is executed;
- timer means for starting time measurement when the low consumption power mode is designated and outputting a timeover signal when a predetermined time period elapses;
- signal holding means for holding the timeover signal;
- second switching means for switching the operation mode of said camera to a normal operation mode when a manual operation member is operated in the low consumption power mode; and
- temperature measurement permitting means for checking said signal holding means when the normal operation mode is started, and executing the temperature measurement when the timeover signal is held.

16. A camera according to claim 15, wherein said timer means includes means for changing a time period up to output of the timeover signal in accordance with an executed camera operation.

17. A camera according to claim 15, wherein the camera operation includes a driving operation of an actuator.

18. A camera having a temperature measuring apparatus, comprising:
- temperature measuring means for measuring a temperature of said camera;
- temperature storage means for storing temperature measurement information of said temperature measuring means;
- a plurality of actuating mechanisms including at least one actuating mechanism driven by using the temperature information stored by said temperature storage means;
- control means for controlling one of said plurality of actuating mechanisms;

state holding means to be reset in response to the end of an operation of said control means and be set when a predetermined time period elapses after the end of an operation of said control means;

first setting means for setting said camera in a low consumption power mode in accordance with setting of said state holding means;

second setting means for resetting said camera in a normal operation mode when a manual operation member is operated in the low consumption power mode; and temperature measurement permitting means for checking the content of said state holding means when the normal operation mode is started, and operating said temperature measuring means and said temperature storage means only when said state holding means is set.

19. A camera according to claim 18, wherein said temperature measuring means is provided in a camera IC.

20. A camera according to claim 18, wherein said temperature storage means comprises an electrically erasable and programmable ROM (EEPROM).

21. A camera according to claim 18, wherein said state holding means comprises an electrically erasable and programmable ROM (EEPROM).

22. A camera according to claim 18, wherein the camera operation includes a driving operation of an actuator.

23. A camera according to claim 18, wherein said control means, said state holding means, said first and second setting means, and said temperature measurement permitting means are included in a CPU mounted in said camera.

24. A camera according to claim 18, wherein said state holding means comprises:

timer means for starting time measurement in response to the end of an operation of said control means and outputting a timeover signal when a predetermined time period elapses; and a memory element to be reset in response to the end of an operation of said control means and be set by the timeover signal.

25. A temperature measuring apparatus for a camera, comprising:

a temperature measuring circuit for measuring an environmental temperature;

a memory for storing an output from said temperature measuring circuit;

timer means for measuring a predetermined time period when execution of a camera operation using an actuator is finished;

state holding means to be reset when execution of the camera operation is finished and be set when the time measurement of said timer means is finished; and temperature measurement control means for checking contents of said state holding means when a camera power source is switched on or a camera electric circuit is switched from a standby state to an operative state, and controlling said temperature measuring circuit to perform the temperature measurement when said state holding means is set, and not to perform the temperature measurement when said state holding means is reset.

26. An apparatus according to claim 25, wherein said temperature measuring circuit is provided in a camera IC.

27. An apparatus according to claim 25, wherein said memory comprises an electrically erasable and programmable ROM (EEPROM).

28. An apparatus according to claim 25, wherein said state holding means comprises an electrically erasable and programmable ROM (EEPROM).

29. A temperature measuring method for a camera, comprising the steps of:

driving an actuator;

starting a time measurement when driving of said actuator is finished;

setting temperature measurement permission information when said actuator does not operate for a predetermined time period after the time measurement is started, and resetting the temperature measurement permission information when said actuator operates before the predetermined time period is reached; and immediately performing temperature measurement of a camera and storing the temperature measurement result when the temperature measurement permission information is set upon an operation of an operation member of said camera.

30. A method according to claim 29, further comprising the step of setting said camera in a stop state in which power consumption is low when the temperature measurement permission information is set.

31. A method according to claim 29, further comprising the step of using the stored temperature measurement result when the temperature measurement permission information is reset when said operating member of said camera is operated.

* * * * *

UNITED STATES PATENT AND TRADEMARK OFFICE
CERTIFICATE OF CORRECTION

PATENT NO. : 5,162,836

DATED : November 10, 1992

INVENTOR(S) : Toshiaki Ishimaru

It is certified that error appears in the above-identified patent and that said Letters Patent is hereby corrected as shown below:

```
Title  page, delete Section [30], "Foreign
Application Priority Data" and "Mar. 20, 1990 [JP]
Japan.........2-71025".
```

Signed and Sealed this

Eighth Day of March, 1994

*Attest:*

BRUCE LEHMAN

*Attesting Officer*     *Commissioner of Patents and Trademarks*